United States Patent
Vijayvargiya et al.

(10) Patent No.: US 12,086,234 B2
(45) Date of Patent: Sep. 10, 2024

(54) SYSTEM AND METHOD FOR CHECKING REPUTATIONS OF EXECUTABLE FILES USING FILE ORIGIN ANALYSIS

(71) Applicant: VMWARE, INC., Palo Alto, CA (US)

(72) Inventors: Shirish Vijayvargiya, Pune (IN); Pankaj Suryawanshi, Pune (IN); Roshan Kolhe, Pune (IN)

(73) Assignee: VMware LLC, Palo Alto, CA (US)

(*) Notice: Subject to any disclaimer, the term of this patent is extended or adjusted under 35 U.S.C. 154(b) by 0 days.

(21) Appl. No.: 17/507,825

(22) Filed: Oct. 22, 2021

(65) Prior Publication Data

US 2023/0041397 A1    Feb. 9, 2023

(30) Foreign Application Priority Data

Aug. 6, 2021  (IN) .............................. 202141035579

(51) Int. Cl.
*H04L 29/06* (2006.01)
*G06F 21/52* (2013.01)

(52) U.S. Cl.
CPC ........ *G06F 21/52* (2013.01); *G06F 2221/033* (2013.01)

(58) Field of Classification Search
CPC ........................... G06F 21/52; G06F 2221/033
See application file for complete search history.

(56) References Cited

U.S. PATENT DOCUMENTS

| | | | |
|---|---|---|---|
| 2007/0078936 A1* | 4/2007 | Quinlan | G06Q 10/107 709/206 |
| 2015/0264077 A1* | 9/2015 | Berger | G06F 21/51 726/23 |
| 2019/0080080 A1* | 3/2019 | Ogura | G06F 21/572 |
| 2021/0209222 A1* | 7/2021 | Jeong | G06F 21/6218 |

* cited by examiner

*Primary Examiner* — Evans Desrosiers
(74) *Attorney, Agent, or Firm* — King Intellectual Asset Management (57) ABSTRACT

System and method for checking reputations of executable files in an endpoint device use an integrity verification on an executable file being scanned to determine whether the executable file has been unaltered since being installed in the endpoint device. When the executable file has been determined to be unaltered since being installed in the endpoint device, a file origin analysis is executed on the executable file based on a vendor identifier for the executable file to determine whether the executable file is from an approved source. When the executable file is determined to be from an approved source, an output is produced that indicates that the executable file has an approved reputation.

20 Claims, 6 Drawing Sheets

SYSTEM AND METHOD FOR CHECKING REPUTATIONS OF EXECUTABLE FILES USING FILE ORIGIN ANALYSIS

RELATED APPLICATIONS

Benefit is claimed under 35 U.S.C. 119(a)-(d) to Foreign Application Serial No. 202141035579 filed in India entitled "SYSTEM AND METHOD FOR CHECKING REPUTATIONS OF EXECUTABLE FILES USING FILE ORIGIN ANALYSIS", on Aug. 6, 2021, by VMware, Inc., which is herein incorporated in its entirety by reference for all purposes.

BACKGROUND

Defense systems for cybersecurity typically use a local reputation checker to detect system breach. The local reputation checker uses application whitelist as a reference database to locally determine whether an application is safe with minimal cloud reputation lookup. This is done to mitigate application execution stall time and reduce the amount of network traffic and cost of lookups on the cloud backend to determine the reputations of applications on a system.

There are two major challenges faced by the conventional local reputation checker to detect system breach. The first challenge is due to the fact that the local reputation checker relies on a reference application whitelist database. Thus, the first step for the local reputation checker to operate in a system is to create the reference application whitelist database while the system is in pristine condition with known and safe software. This means that the reference application whitelist database must be created before the system is connected to any other computer or network and that all the software installed on the system have been obtained from reputable or reliable sources. Otherwise, the system may be unknowingly compromised, giving one a false and dangerous sense of security.

The second challenge is to keep the reference application whitelist database away from the reach of attackers. Otherwise, an attacker may compromise the system by modifying the reference application whitelist database.

In view of these challenges, there is a need for a local reputation checker that does not rely on an application whitelist database.

BRIEF DESCRIPTION OF THE DRAWINGS

Throughout the description, similar reference numbers may be used to identify similar elements.

DETAILED DESCRIPTION

Figure 1:
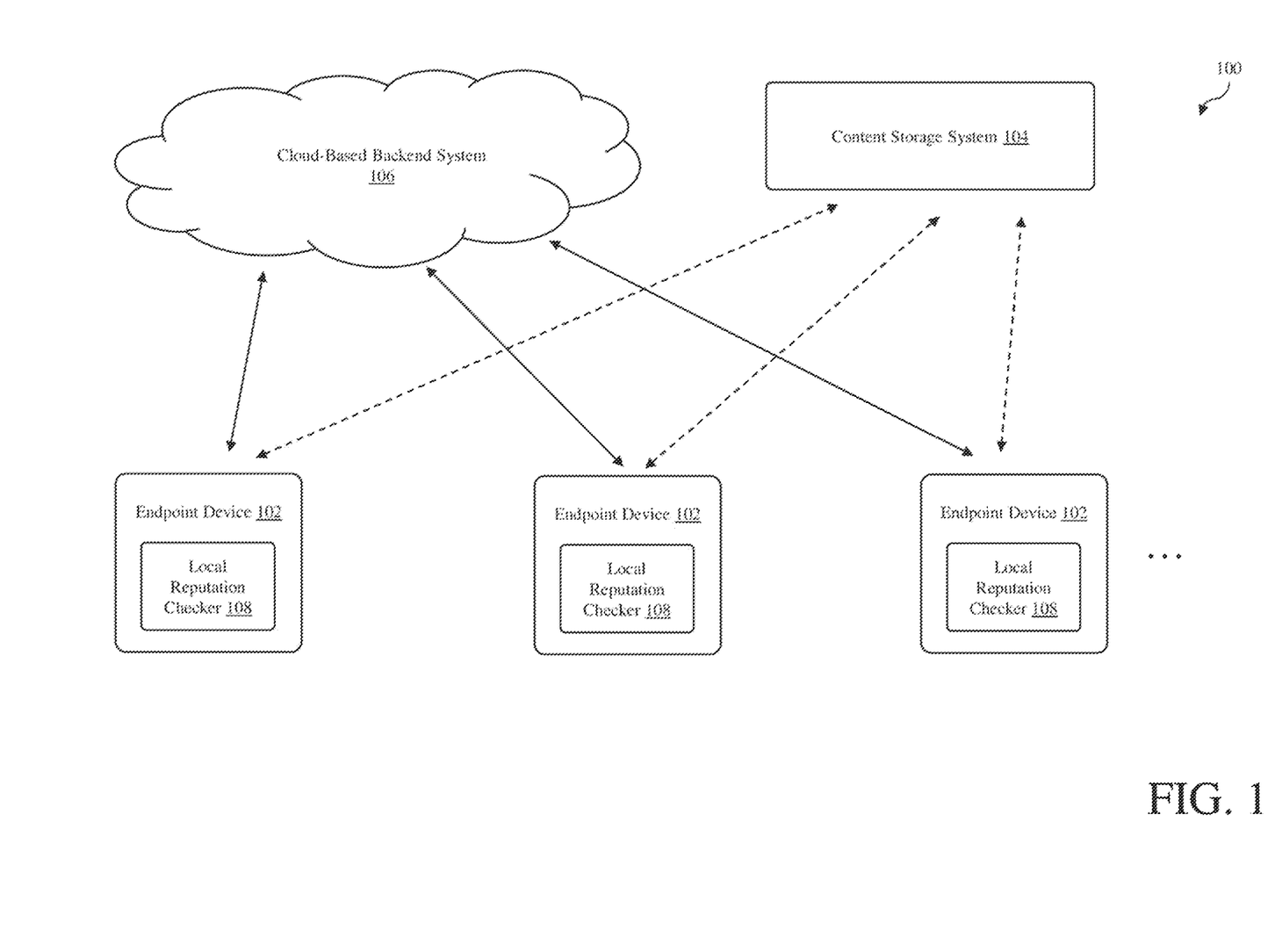
FIG. 1 is a block diagram of an endpoint defense system in accordance with an embodiment of the invention.

FIG. 1 depicts an endpoint defense system 100 in accordance with an embodiment of the invention. As shown in FIG. 1, the endpoint defense system 100 includes a number of endpoint devices 102, a content storage system 104 and a cloud-based backend system 106. Each of the endpoint devices 102 includes a local reputation checker 108 that can locally check the reputation of an executable file or binary in the endpoint device without relying an application whitelist. Rather, the local reputation checker 108 in each of the endpoint devices 102 relies on a file origin analysis to determine whether an executable file has an approved reputation, which indicates that the executable file is safe to run in the endpoint device, as described in detail below. Thus, some of the challenges of using an application whitelist for checking the reputations of executable files are resolved in the endpoint defense system 100.

The conventional application whitelist based approach has several disadvantages. One of the disadvantages is that an application whitelist database generated for one operating system (OS) may not be applicable for another OS because each flavor of OS may have a different version of the same binary or executable file. Another disadvantage is that an application whitelist database generated for a machine kept in a pristine environment may not be applicable to the same machine if the machine is upgraded. Still another disadvantage is that the size of the application whitelist database can be in the megabytes (MBs) or gigabytes (GBs) since the database needs to maintain all required binaries. The endpoint defense system 100 addresses at least some of these disadvantages by using a file origin analysis for checking the reputations of executable files, as explained below.

In the embodiment shown in FIG. 1, the endpoint devices 102 interact with the content storage system 104 and the cloud-based backend system 106. The content storage system 104 operates to store file information needed by the local reputation checker 108 in each of the endpoint devices 102 for checking the reputation of executable files during scans. Specifically, the content storage system 104 stores file source information for executable files that is used by the local reputation checker 108 in each of the endpoint devices 102 for file origin analysis. The file source information may include vendor identifiers for executable files that indicate that the executable files are from trusted or approved vendors. In a particular implementation, the vendor identifiers are digital signature keys for the executable files. The digital signature key for a specific executable file may be a key used only for that executable file or may be used for a software installer package that included that specific executable file, such as a Pretty Good Privacy (PGP) signature key used to sign a software package. The content storage system 104 can provide the source information to the endpoint devices 102 as needed. In some embodiments, the content storage system 104 may be a content delivery network (CDN).

The cloud-based backend system 106 operates to provide reputation checking services for the endpoint devices 102 when needed. The cloud-based backend system 106 may use any reputation checking algorithm to produce reputation results for executable files that are requested by the endpoint devices 102. In some embodiments, the services of the cloud-based backend system 106 may be requested by the local reputation checker 108 in any of the endpoint devices 102 when the local reputation checker cannot locally determine the reputation of one or more executable files being scanned. However, using the services of the cloud-based backend system 106 is not preferred because of significant application execution stall time and network traffic, as well as other costs, associated with requesting such services from the cloud-based backend system 106, which can be any cloud-based reputation checking system, such as VMware Carbon Black Cloud.

The endpoint devices 102 of the endpoint defense system 100 can be any computing devices with networking capabilities. As an example, the endpoint devices 102 can be physical computing devices, such as laptops, desktops, servers and point of sales (POS) machines. However, the endpoint devices 102 can also be virtual computing devices, such as virtual computing instances. As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, California A virtual container is a package that relies on virtual isolation to deploy and run applications that access a shared operating system (OS) kernel. An example of a virtual container is the virtual container created using a Docker engine made available by Docker, Inc.

Figure 2:
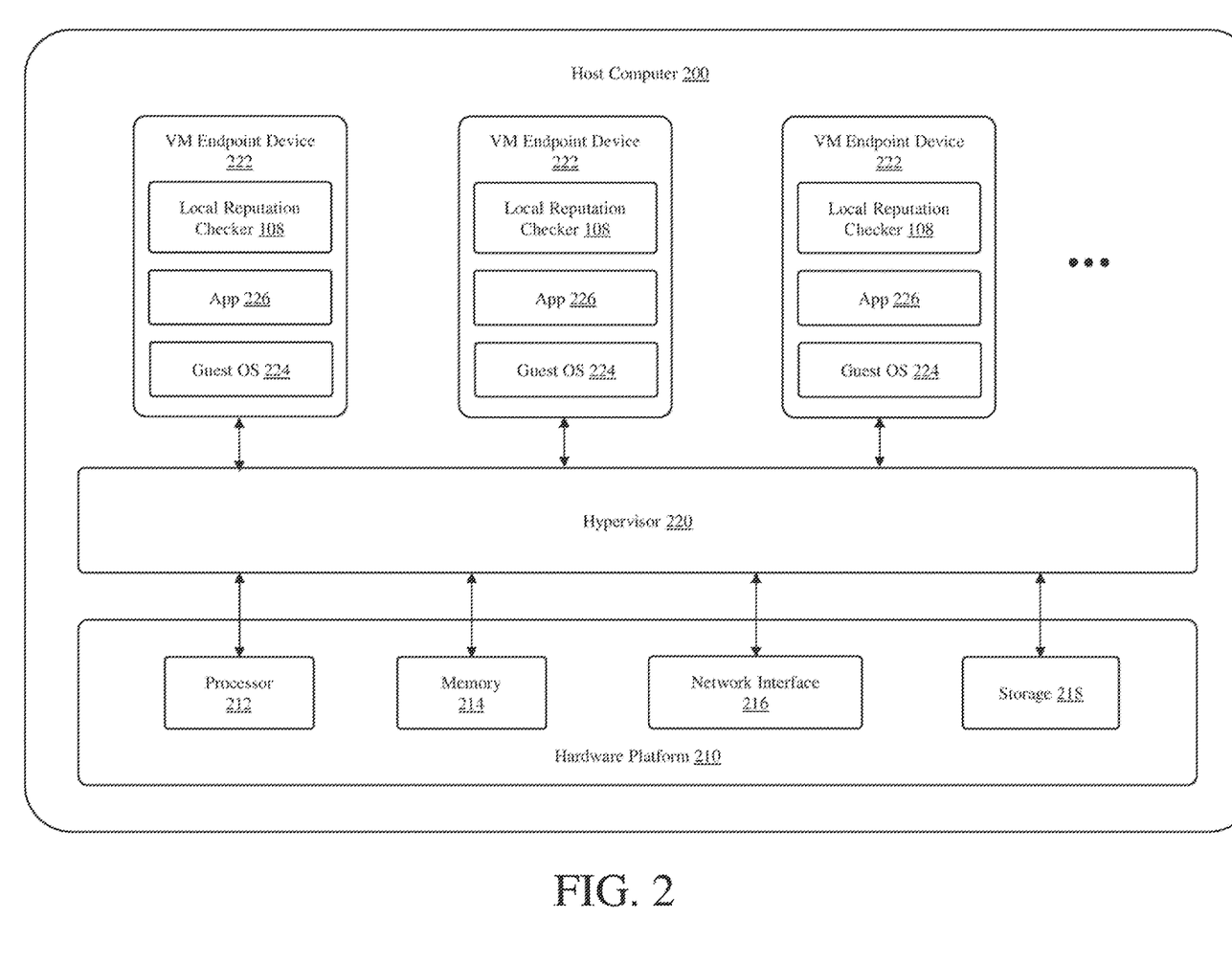
FIG. 2 is a block diagram of a host computer on which endpoint devices in the form of virtual machines are hosted in accordance with an embodiment of the invention.

In some implementations, the endpoint devices 102 are virtual machines (VMs) hosted on one or more host computers. An example of a host computer 200 that can support one or more VM endpoint devices is illustrated in FIG. 2. As shown in FIG. 2, the host computer 200 includes a physical hardware platform 210, which includes at least one or more processors 212, one or more system memories 214, a network interface 216 and a storage 218. Each processor 212 can be any type of a processor, such as a central processing unit (CPU) commonly found in a server computer. Each system memory 214, which may be random access memory (RAM), is the volatile memory of the host computer. The network interface 216 is any interface that allows the host computer to communicate with other devices through one or more computer networks. As an example, the network interface 216 may be a network interface controller (NIC). The storage 218 can be any type of non-volatile computer storage with one or more local storage devices, such as solid-state devices (SSDs) and hard disks.

The host computer 200 further includes a virtualization software 220 running directly on the hardware platform 210 or on an operation system (OS) of the host computer. The virtualization software 220 can support one or more virtual computing instances (VCIs) 222, which are VMs and labeled as VM endpoint devices in the illustrated embodiment. In addition, the virtualization software 220 can deploy or create VCIs on demand. Although the virtualization software 220 may support different types of VCIs, the virtualization software 220 is described herein as being a hypervisor, which enables sharing of the hardware resources of the host computer by the VMs 222 that are hosted by the hypervisor. One example of a hypervisor that may be used in an embodiment described herein is a VMware ESXi™ hypervisor provided as part of the VMware vSphere® solution made commercially available from VMware, Inc. of Palo Alto, California.

The hypervisor 220 provides a device driver layer configured to map physical resources of the hardware platform 210 to "virtual" resources of each VM 222 supported by the hypervisor such that each VM has its own corresponding virtual hardware platform. Each such virtual hardware platform provides emulated or virtualized hardware (e.g., memory, processor, storage, network interface, etc.) that may function as an equivalent to conventional hardware architecture for its corresponding VM.

With the support of the hypervisor 220, the VMs or VM endpoint devices 222 provide isolated execution spaces for guest software. Each VM endpoint device 222 may include a guest operating system (OS) 224 and one or more guest applications 226. The guest OS manages virtual hardware resources made available to the corresponding VM by the hypervisor 220, and, among other things, the guest OS forms a software platform on top of which the guest applications 226 run. The guest OS in any of the VM endpoint devices may be any type of OS, such as Linux OS, Windows OS or Mac OS.

Each VM endpoint device 222 further includes the local reputation checker 108, which can determine whether executable files used by that VM endpoint device are safe, i.e., have "approved reputation", or potentially unsafe, i.e., have "unknown reputation", without using an application whitelist database, which has several disadvantages as described above. Instead of an application whitelist database, the local reputation checker 108 relies on a file origin analysis to determine whether an executable file is safe to run in the VM endpoint device. The file origin analysis is based on using a vendor identifier for an executable file, such as a digital signature key for the executable file, to determine whether the executable file is from a reliable source. In an embodiment, the local reputation checker 108 performs the file origin analysis by comparing a digital signature key for an executable file with approved digital signature keys, which are stored in a secure location, e.g., a volatile memory that is accessible only by the hypervisor 220. The digital signature key for the executable file is a key used to sign the executable file or a software installer package that included the executable file by the vendor of the executable file or an agent of the vendor. Thus, the digital signature key of the executable file can be viewed as a vendor identifier. If the digital signature key for the executable file matches one of the approved digital signature keys, then the executable file is deemed to be from an approved source, i.e., a trusted vendor, and thus, can be considered to have an approved reputation. In such a case, the executable file is considered to be safe. Otherwise, the reputation of the executable file is deemed to be unknown. In such a situation, the reputation of the executable file may be checked using alternative means, e.g., using the remote reputation checking services of the cloud-based backend system 106, as explained below.

In some embodiments, the local reputation checker 108 may first execute an integrity verification on the executable file to determine whether the executable file has been altered or changed since installation to ensure that the executable file has not been tampered with for malicious purpose. In an embodiment, a hash of the executable file is calculated and compared to a stored hash of the executable file to determine whether the executable file has been altered since its installation in the VM endpoint device. If the hashes do not match, then it is assumed that the executable file cannot be considered safe. If the hashes do match, it is determined that the executable file has not been altered since its installation in the VM endpoint device and a file origin analysis is performed on the executable file to determine whether the executable file is from an approved source.

Figure 3:
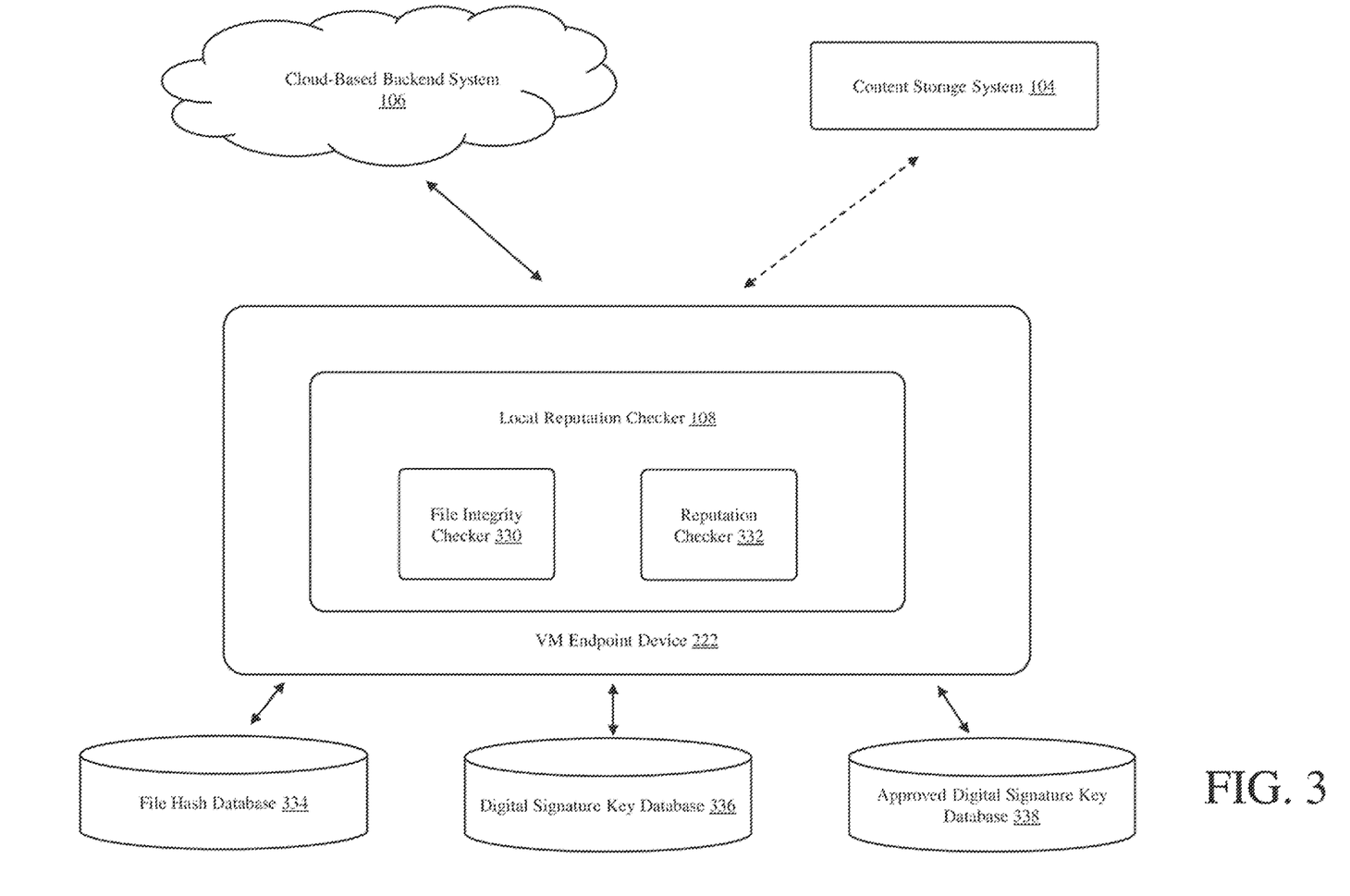
FIG. 3 is a diagram illustrating the interactions between a virtual machine (VM) endpoint device, a cloud-based backend system and a content storage system of the endpoint defense system in accordance with an embodiment of the invention.

The local reputation checker 108 in each of the VM endpoint devices 222 is further described with reference to FIG. 3, which shows the local reputation checker 108 in one of the VM endpoint devices 222 with the content storage system 104 and the cloud-based backend system 106 in accordance with an embodiment of the invention. As shown in FIG. 3, in this embodiment, the local reputation checker 108 includes a file integrity checker 330 and a reputation checker 332, which execute operations to determine whether one or more executable files in the VM endpoint device 222 have approved reputations, indicating that the executable files are trustworthy and safe to operate in the VM endpoint device.

The file integrity checker 330 executes operations for integrity verification to determine whether an executable file being scanned has been tampered with, i.e., has been altered or modified, since the executable file has been installed in the VM endpoint device 222. In an embodiment, when an executable file is being processed, the file integrity checker 330 computes a hash of the executable file using a hashing algorithm, such as the secure hash algorithm 256 (SHA-256). The computed hash of the executable file is then compared to a stored hash of the executable file, which may be included in a file hash database 334. In some embodiments, the file hash database 334 may be included in a database of a package manager running in the VM endpoint device, such as an RPM Package Manager (RPM) database, which may be stored locally in the storage of the host computer (e.g., in a virtual disk of the VM endpoint device 222) on which the VM endpoint device is being hosted. The stored hash of the executable file may be included in a software installer package that included the executable file. If not included in the software package, the stored hash of the executable file may be computed by the file integrity checker 330 or another component in the VM endpoint device when the executable file is installed in the VM endpoint device. In an embodiment, if the computed hash of the executable file does not match the stored hash of the executable file, the reputation of the executable file may be deemed to be unknown by the file integrity checker 330. However, if the computed hash of the executable file does match the stored hash of the executable file, the executable file is then passed to the reputation checker 332 for further processing, i.e., for a file origin analysis.

The reputation checker 332 executes operations to determine whether an executable file being scanned can be locally determined to be safe using a file origin analysis. After an executable file has been approved by the file integrity checker 330, i.e., determined to be unaltered since the executable file has been installed in the VM endpoint device 222, a vendor identifier for the executable file is checked by the reputation checker 332 to determine whether the executable file is from a trustworthy vendor, which would indicate that the executable file is safe. In an embodiment, the vendor identifier is a digital signature key for the executable file, which is checked by the reputation checker 332 to determine whether the digital signature key is one of approved digital signature keys from trustworthy vendors. In this embodiment, the digital signature key for the executable file is retrieved from a digital signature key database 336 stored in a local storage, e.g., a virtual disk of the VM endpoint device 222, by the reputation checker 332. In some cases, the digital signature key for the executable file is a digital signature key that was used to sign a software installer package that included the executable file, which is then stored locally when the software package is installed in the VM endpoint device. In other cases, the digital signature key for the executable file is a digital signature key exclusively for the executable file, which is stored locally when the executable file is installed or loaded in the VM endpoint device. In some embodiments, the digital signature key for the executable file may be stored in a package manager database, such as an RPM database.

After the digital signature key for the executable file is retrieved, a database 338 of approved digital signature keys is searched by the reputation checker 332 to determine if the retrieved digital signature key is one of the approved digital signature keys. The approved digital signature keys in the database 338 are keys from approved sources, i.e., approved software vendors or their agents. Thus, if a digital signature key for an executable file matches one of the approved digital signature keys, that executable file can be determined to be from a reliable or trusted source, which indicates that the executable file is safe. In an embodiment, if the digital signature key for the executable file matches one of the approved digital signature keys, then the executable file is deemed to have "approved reputation" by the reputation checker 332. However, if the digital signature key for the executable file does not match one of the approved digital signature keys, then the executable file is deemed to have "unknown reputation" by the reputation checker 332. In such a case, a request can be made to the cloud-based backend system 106 to remotely determine the reputation of the executable file at the cloud-based backend system.

The database 338 of approved digital signature keys is preferably stored in a secure place and easily accessible by the reputation checker 332. In some implementations, the database of approved digital signature keys may be downloaded from the content storage system 104 to the host computer on which the VM endpoint device 222 is being hosted, and stored in a volatile memory that is allocated to the hypervisor of the host computer when the hypervisor is initialized or booted in the host computer. The approved digital signature key database 338 may include keys for all executable files provided by trusted vendors irrespective of OS versions. In a typical implementation, the size of the approved digital signature key database 338 is few kilobytes (KBs) so there are no scalability and size concerns. In addition, the approved digital signature key database 338 can be downloaded from the content storage system 104 without much impact on cost and network bandwidth. Once stored in the host computer, the approved digital signature key database 338 can be used by all endpoint devices running on the host computer.

Figure 4A:
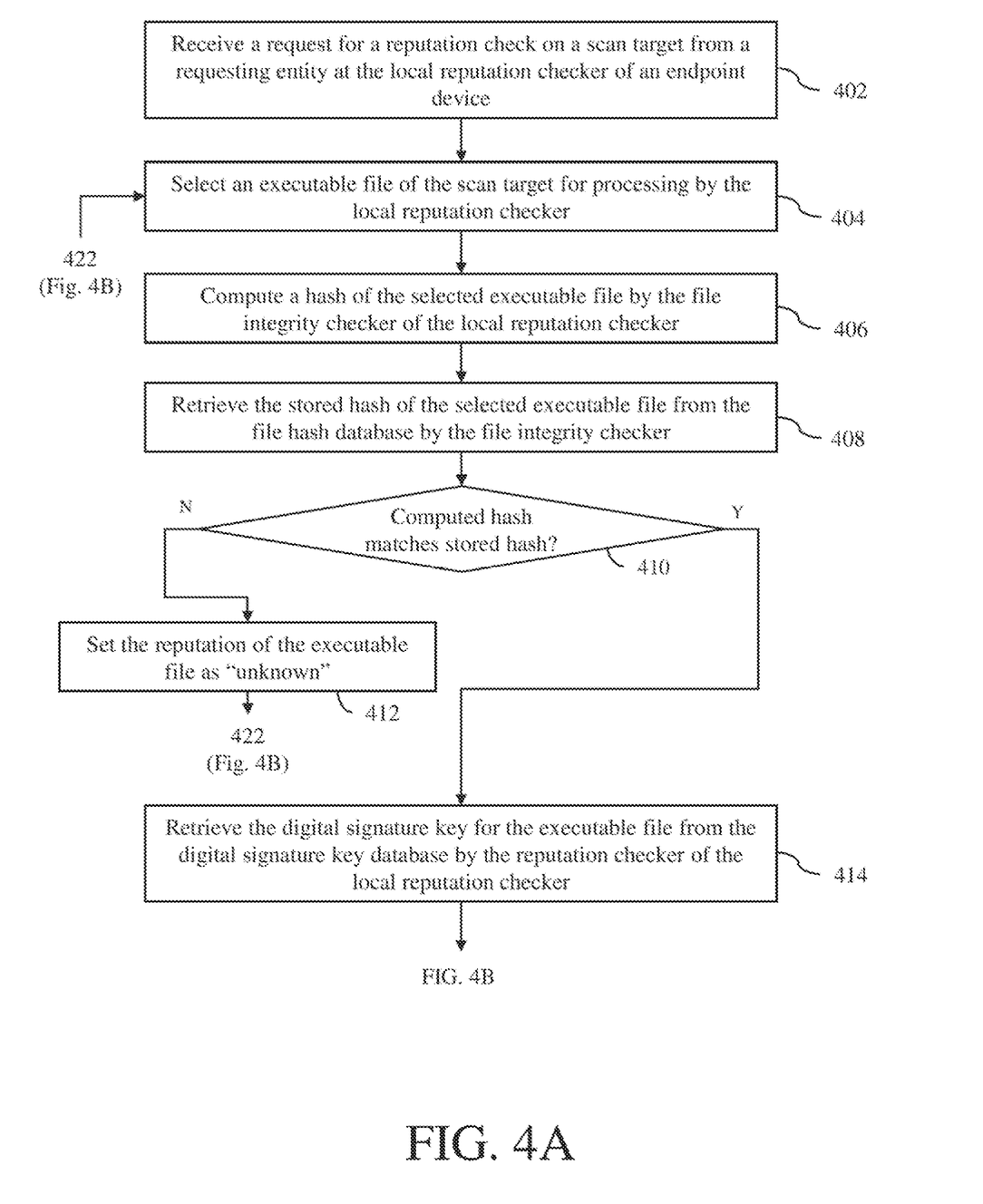
FIGS. 4A and 4B is a flow diagram of a process of performing a reputation check on one or more executable files in an endpoint device in accordance with an embodiment of the invention.
Figure 4B:
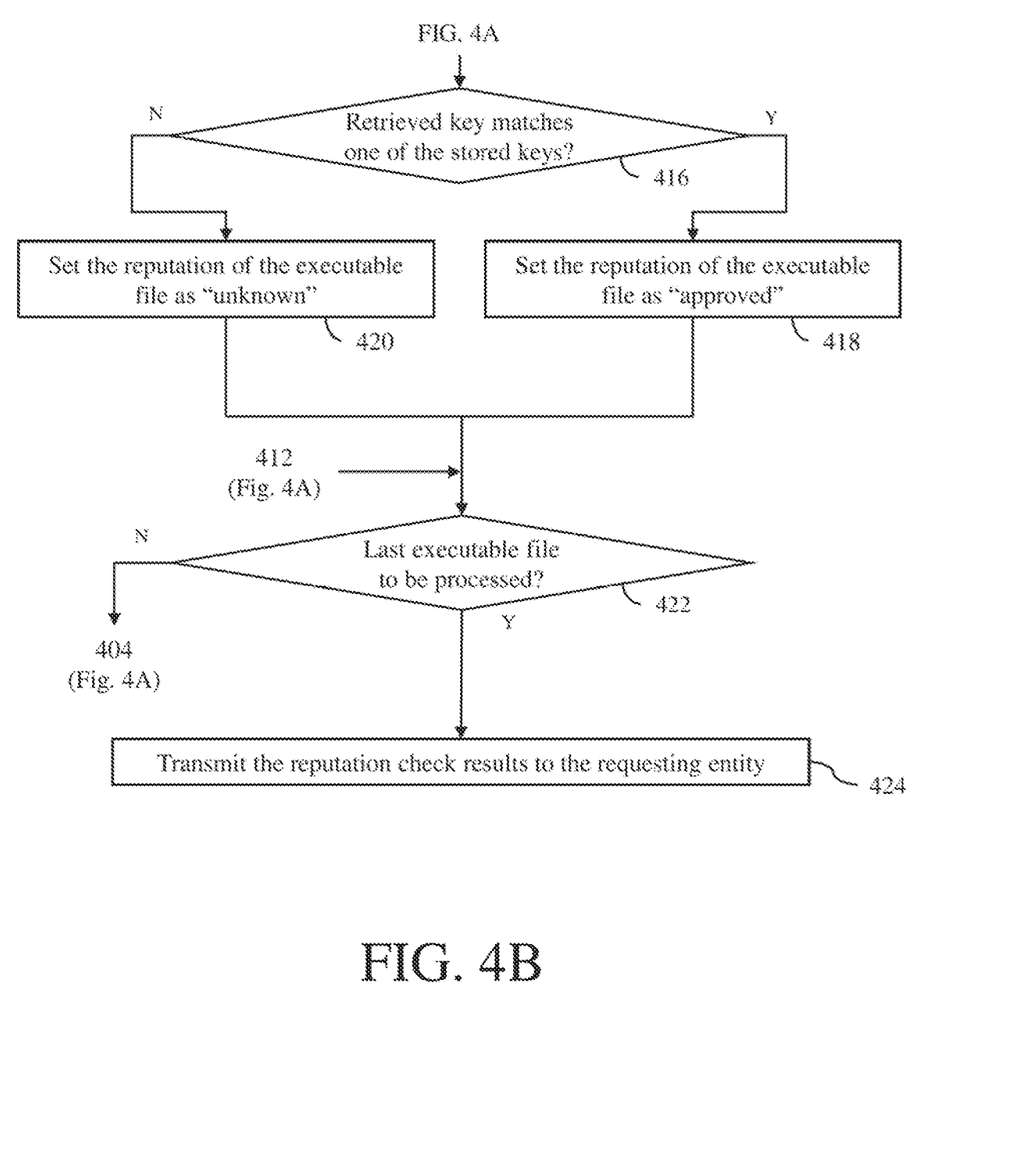

A process of performing a reputation check on one or more executable files in an endpoint device 102 in accordance with an embodiment of the invention is now described with reference to a process flow diagram shown in FIGS. 4A and 4B. In this embodiment, the endpoint device is a VM, such as one of the VM endpoint devices 222 depicted in FIG. 2, which has a Linux OS with an RPM database, running on a host computer, such as the host computer 200 depicted in FIG. 2. However, in other embodiments, the endpoint device may be an endpoint device with a different OS and/or a different package manager database.

The process begins at step 402, where a request for a reputation check on a scan target from a requesting entity is received at the local reputation checker 108 in the endpoint device. The requesting entity may be a user interface (UI) or an automated process running in the endpoint device or another computer system connected to the endpoint device. In some embodiments, the reputation check may be performed as part of a background antivirus scan or an on-demand antivirus scan. For a background antivirus scan, the scan target includes all the executable files in the endpoint device. For an on-demand antivirus scan, the scan target includes a subset of all the executable files in the endpoint device, which may be a single executable file or a group of executable files stored in a specific location in the storage of the endpoint device, e.g., a particular volume of a virtual disk. If the scan is initiated by a user, the UI may be used to enter a command to initiate the scan. The UI may be provided by the endpoint device, another computer system connected to the endpoint device or an external UI connected to the endpoint device, such as a web-based interface.

Next, at step 404, an executable file of the scan target is selected for processing by the local reputation checker 108. In an embodiment, any methodology may be used to select the executable file. For example, the selection may be based on a random method or based on an alphanumeric order of names of the target executable files.

Next, at step 406, a hash of the selected executable file is computed by the file integrity checker 330 of the local reputation checker 108. In an embodiment, a secure hash algorithm 256 (SHA-256) may be used to compute the hash of the selected executable file. However, in other embodiments, a different hashing algorithm may be used to compute the hash of the selected executable file.

Next, at step 408, the stored hash of the selected executable file is retrieved from the file hash database 334 by the file integrity checker 330. In a particular implementation where the file hash database 334 is included in an RPM database, a query command of "rpm -qf<file name> --dump" may be used to find the stored hash of the selected executable file.

Next, at step 410, a determination is made by the file integrity checker 330 whether the computed hash of the selected executable file matches the stored hash of the selected executable file. That is, the computed hash of the selected executable file is compared to the stored hash of the selected executable file to see if the two hashes are same, i.e., identical. If the computed hash and the stored hash of the selected executable file do match, then the process proceeds to step 414. However, if the computed hash and the stored hash of the selected executable file do not match, then the process proceeds to step 412, where the reputation of the selected executable file is set as "unknown" by the file integrity checker 330. The process then proceeds to step 422.

The checking of the computed hash of the selected executable file with the stored hash of the selected executable file is part of the file integrity verification process executed by the file integrity checker 330. The file integrity verification is performed to make sure the executable file has not been altered or modified for malicious purpose since the executable file was installed in the endpoint device. By making sure that the computed hash is same as the stored hash, one can be assured that the executable file has not been tampered with and that the executable file being scanned is same as the executable file that was originally installed on the endpoint device. Once it is determined that the executable file is same as the original executable file, the process then proceeds to perform a file origin analysis on the executable file to make sure that the executable file is from a trusted or approved source.

At step 414, the digital signature key for the executable file is retrieved from the digital signature key database 336 by the reputation checker 332 of the local reputation checker 108. The digital signature key may be a signature key exclusively for the executable file when the executable file was installed in the endpoint device. Alternatively, the digital signature key may be a signature key for a software installer package that included the executable file when the package was installed in the endpoint device. In a particular implementation where the digital signature key database 336 is included in an RPM database, a query command of "rpm -qf<file-path> --qf '%{SIGPGP:pgpsig}'" may be used to retrieve the digital signature key for the software installer package that included the executable file. The following are two examples of digital signature keys that are retrieved using the query command:

(1) centos-7_7~vm~]$ rpm -qf/usr/bin/rename --qf'%{SIGPGP:pgpsig}' RSA/SHA256, Wed 14 Oct. 2020 07:02:31 PM UTC, Key ID 24c6a8a7f4a80eb5; and (2) centos-7_7~vm~]$ rpm -qf/usr/bin/perl --qf'%{SIGPGP:pgpsig}' RSA/SHA256, Wed 14 Oct. 2020 06:58:29 PM UTC, Key ID 24c6a8a7f4a80eb5.

Next, at step 416, a determination is made by the reputation checker 332 whether the retrieved digital signature key for the selected executable file matches one of the stored digital signature keys in the approved digital signature key database 338. That is, the retrieved digital signature for the selected executable file is compared to the stored digital signature keys in the approved digital signature key database 338 to see if the executable file is from an approved vendor or its agent. If the retrieved digital signature matches with a digital signature key stored in the approved digital signature key database 338, the process proceeds to step 418, where the reputation of the selected executable file is set as "approved" by the reputation checker 332. The process then proceeds to step 422. However, if the retrieved digital signature does not match with any of the digital signature keys stored in the approved digital signature key database 338, then the process proceeds to step 420, where the reputation of the selected executable file is set as "unknown" by the reputation checker 332. The process then proceeds to step 422.

In some embodiments, when the reputation of an executable file is determined be "unknown" by the reputation checker 332, a request is made from the local reputation checker 108 to the cloud-base backend system 106 for a remote reputation check on the executable file. In these embodiments, the process continues after the results of the remote reputation check on the executable file from the cloud-base backend system 106 are received by the reputation checker 332.

Next, at step 422, a determination is made by the reputation checker 332 whether another executable file exists in the scan target that needs to be processed. If there is another executable file that needs to be processed, then the process proceeds back to step 404 so that the reputation of the next executable file can be checked. However, if there is no other executable file that needs to be processed, then the process proceeds to step 424.

Next, at step 424, the results of the reputation check are transmitted to the requesting entity by the local reputation checker 108. In some embodiments, each executable file that was determined to have an "unknown reputation" may be quarantined by the local reputation checker 108 or another component in the endpoint device to ensure that the executable file does not execute malicious operations.

Figure 5:
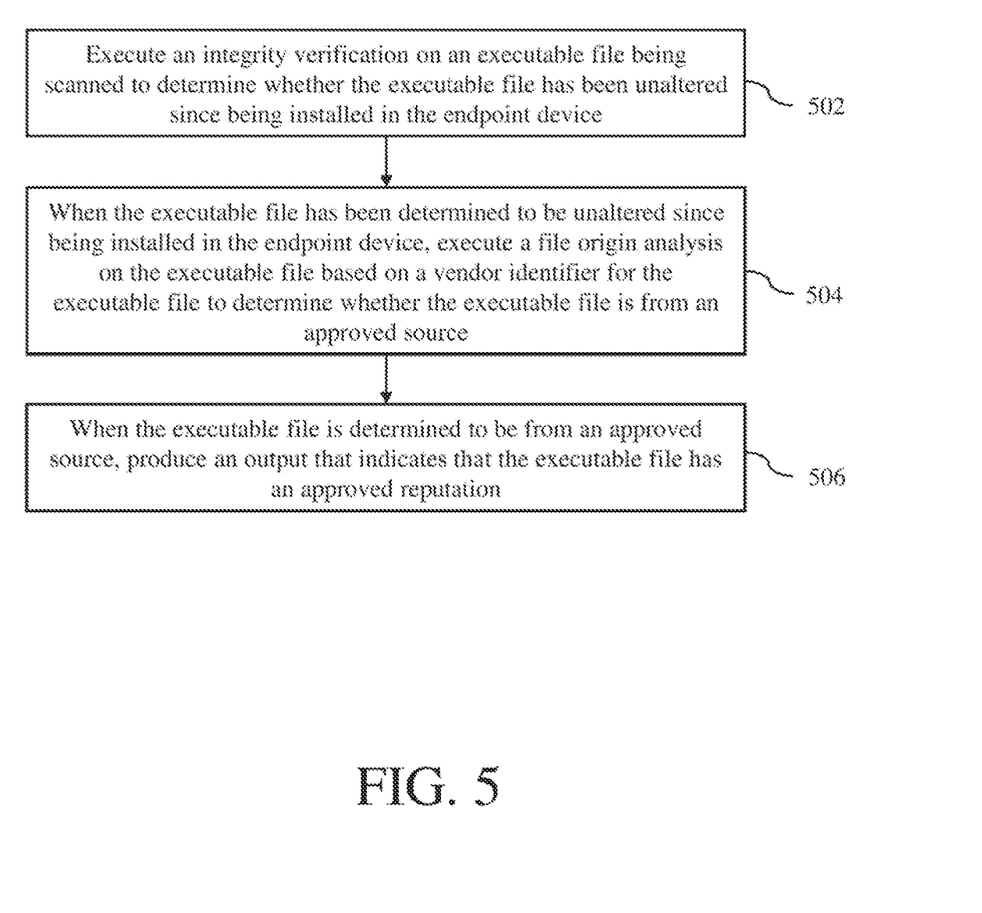
FIG. 5 is a flow diagram of a computer-implemented method for checking reputations of executable files in an endpoint device in accordance with an embodiment of the invention.

A computer-implemented method for checking reputations of executable files in an endpoint device, such as one of the endpoint devices 102 in the endpoint defense system 100, in accordance with an embodiment of the invention is described with reference to a flow diagram of FIG. 5. At block 502, an integrity verification is executed on an executable file being scanned to determine whether the executable file has been unaltered since being installed in the endpoint device. At block 504, when the executable file has been determined to be unaltered since being installed in the endpoint device, a file origin analysis is executed on the executable file based on a vendor identifier for the executable file to determine whether the executable file is from an approved source. At block 506, when the executable file is determined to be from an approved source, an output is produced that indicates that the executable file has an approved reputation.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, non-volatile memory, NVMe device, persistent memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for checking reputations of executable files in an endpoint device, the method comprising:
   executing an integrity verification on an executable file being scanned to determine whether the executable file has been unaltered since being installed in the endpoint device, wherein executing an integrity verification comprises:
   computing a hash of the executable file;
   searching for a stored hash of the executable file in a local storage of the endpoint device;
   comparing the computed hash of the executable file with the stored hash of the executable file; and
   when the computed hash of the executable file matches the stored hash of the executable file, determining that the executable file has been unaltered since being installed in the endpoint device;

when the executable file has been determined to be altered since being installed in the endpoint device, setting a reputation of the executable file as unknown;

when the executable file has been determined to be unaltered since being installed in the endpoint device, executing a file origin analysis on the executable file based on a vendor identifier for the executable file to determine whether the executable file is from an approved source, wherein the vendor identifier for the executable file is a key used to sign a software installer package that included the executable file that is stored locally when the software installer package is installed in the endpoint device; and when the executable file is determined to be from an approved source, producing an output that indicates that the executable file has an approved reputation.

2. The computer-implemented method of claim 1, wherein the vendor identifier includes a digital signature key for the executable file and wherein executing the file origin analysis on the executable file comprises:

retrieving the digital signature key for the executable file from a local storage of the endpoint device;

searching a database of approved digital signature keys to find the digital signature key for the executable file in the database of approved digital signature keys;

and when the digital signature key for the executable file is found in the database of approved digital signature keys, determining that executable file is from an approved source.

3. The computer-implemented method of claim 2, wherein the digital signature key for the executable file is the key used to sign the software installer package that included the executable file.

4. The computer-implemented method of claim 2, wherein retrieving the digital signature key for the executable file from the local storage of the endpoint device includes retrieving the digital signature key for the executable file from a database of a package manager running in the endpoint device.

5. The computer-implemented method of claim 2, wherein the endpoint device is a virtual computing instance running on a host computer via a virtualization software, and wherein the database of approved digital signature keys is stored in a volatile memory allocated to the virtualization software.

6. The computer-implemented method of claim 5, further comprising downloading the database of approved digital signature keys to the host computer from a content storage system when the virtualization software is booted.

7. The method of claim 1, further comprising when the executable file is not determined to be from an approved source, sending a request to a cloud-based backend system from the endpoint device for a remote reputation check on the executable file.

8. A non-transitory computer-readable storage medium containing program instructions for checking reputations of executable files in an endpoint device, wherein execution of the program instructions by one or more processors of a computer causes the one or more processors to perform operations comprising:

executing an integrity verification on an executable file being scanned to determine whether the executable file has been unaltered since being installed in the endpoint device, wherein executing an integrity verification comprises:

computing a hash of the executable file;

searching for a stored hash of the executable file in a local storage of the endpoint device;

comparing the computed hash of the executable file with the stored hash of the executable file; and when the computed hash of the executable file matches the stored hash of the executable file, determining that the executable file has been unaltered since being installed in the endpoint device;

when the executable file has been determined to be altered since being installed in the endpoint device, setting a reputation of the executable file as unknown;

when the executable file has been determined to be unaltered since being installed in the endpoint device, executing a file origin analysis on the executable file based on a vendor identifier for the executable file to determine whether the executable file is from an approved source, wherein the vendor identifier for the executable file is a key used to sign a software installer package that included the executable file that is stored locally when the software installer package is installed in the endpoint device; and when the executable file is determined to be from an approved source, producing an output that indicates that the executable file has an approved reputation.

9. The non-transitory computer-readable storage medium of claim 8, wherein the vendor identifier includes a digital signature key for the executable file and wherein executing the file origin analysis on the executable file comprises:

retrieving the digital signature key for the executable file from a local storage of the endpoint device;

searching a database of approved digital signature keys to find the digital signature key for the executable file in the database of approved digital signature keys;

and when the digital signature key for the executable file is found in the database of approved digital signature keys, determining that executable file is from an approved source.

10. The non-transitory computer-readable storage medium of claim 9, wherein the digital signature key for the executable file is the key used to sign the software installer package that included the executable file.

11. The non-transitory computer-readable storage medium of claim 9, wherein retrieving the digital signature key for the executable file from the local storage of the endpoint device includes retrieving the digital signature key for the executable file from a database of a package manager running in the endpoint device.

12. The non-transitory computer-readable storage medium of claim 9, wherein the endpoint device is a virtual computing instance running on a host computer via a virtualization software, and wherein the database of approved digital signature keys is stored in a volatile memory allocated to the virtualization software.

13. The non-transitory computer-readable storage medium of claim 12, wherein the operations further comprise downloading the database of approved digital signature keys to the host computer from a content storage system when the virtualization software is booted.

14. The non-transitory computer-readable storage medium of claim 8, wherein the operations further comprise, when the executable file is not determined to be from an approved source, sending a request to a cloud-based backend system from the endpoint device for a remote reputation check on the executable file.

15. A system comprising:
memory; and
at least one processor configured to:

execute an integrity verification on an executable file being scanned to determine whether the executable file has been unaltered since being installed in an endpoint device, wherein executing an integrity verification comprises:
computing a hash of the executable file;
searching for a stored hash of the executable file in a local storage of the endpoint device;
comparing the computed hash of the executable file with the stored hash of the executable file; and
when the computed hash of the executable file matches the stored hash of the executable file, determining that the executable file has been unaltered since being installed in the endpoint device;
when the executable file has been determined to be altered since being installed in the endpoint device, set a reputation of the executable file as unknown;
when the executable file has been determined to be unaltered since being installed in the endpoint device, execute a file origin analysis on the executable file based on a vendor identifier for the executable file to determine whether the executable file is from an approved source, wherein the vendor identifier for the executable file is a key used to sign a software installer package that included the executable file that is stored locally when the software installer package is installed in the endpoint device; and
when the executable file is determined to be from an approved source, produce an output that indicates that the executable file has an approved reputation.

16. The system of claim 15, wherein the vendor identifier includes a digital signature key for the executable file and wherein the at least one processor is configured to:
retrieve the digital signature key for the executable file from a local storage of the endpoint device;
search a database of approved digital signature keys to find the digital signature key for the executable file in the database of approved digital signature keys; and
when the digital signature key for the executable file is found in the database of approved digital signature keys, determine that executable file is from an approved source.

17. The system of claim 16, wherein the digital signature key for the executable file is the key used to sign the software installer package that included the executable file.

18. The system of claim 16, wherein retrieving the digital signature key for the executable file from the local storage of the endpoint device includes retrieving the digital signature key for the executable file from a database of a package manager running in the endpoint device.

19. The system of claim 16, wherein the endpoint device is a virtual computing instance running on a host computer via a virtualization software, and wherein the database of approved digital signature keys is stored in a volatile memory allocated to the virtualization software.

20. The system of claim 16, further comprising downloading the database of approved digital signature keys to the host computer from a content storage system when the virtualization software is booted.

* * * * *